United States Patent [19]

Kudo et al.

[11] Patent Number: 5,326,240

[45] Date of Patent: Jul. 5, 1994

[54] METAL MOLD DEVICE FOR MOLDING A DISC SUBSTRATE

[75] Inventors: Junichiro Kudo; Jun Shimizu, both of Miyagi, Japan

[73] Assignee: Sony Corporation, Tokyo, Japan

[21] Appl. No.: 957,671

[22] Filed: Oct. 7, 1992

[30] Foreign Application Priority Data

Oct. 12, 1991 [JP] Japan ................... 3-292558
Jan. 8, 1992 [JP] Japan ................... 4-019445
Apr. 21, 1992 [JP] Japan ................... 4-126662

[51] Int. Cl.$^5$ ........................................... B29C 45/00
[52] U.S. Cl. .......................................... 425/3; 264/106;
425/567; 425/571; 425/810; 425/DIG. 60
[58] Field of Search ................... 264/106, 107; 425/3,
425/190, 192 R, 195, 567, 571, 810, DIG. 33,
DIG. 60

[56] References Cited

U.S. PATENT DOCUMENTS

| | | | |
|---|---|---|---|
| 3,545,044 | 12/1970 | Rebovich et al. | 425/3 |
| 4,412,805 | 11/1983 | Morrison | 425/810 |
| 4,472,124 | 9/1984 | Kashihara et al. | 425/3 |
| 4,737,096 | 4/1988 | Poorten | 425/810 |
| 4,795,127 | 1/1989 | Asai | 425/810 |
| 4,879,082 | 11/1989 | Kudo et al. | 425/810 |
| 5,087,184 | 2/1992 | Watanabe et al. | 425/3 |
| 5,092,759 | 3/2992 | Lichtinger et al. | 425/810 |

FOREIGN PATENT DOCUMENTS

0047645A1 3/1982 European Pat. Off. ..... B29D 17/00
0051253A2 5/1982 European Pat. Off. .
0177991A3 4/1986 European Pat. Off. ..... B29C 45/26

OTHER PUBLICATIONS

Patent Abstracts of Japan, vol. 16, No. 105 (P-1325), Mar. 16, 1992 & JP-A-03 280 279 (Ricoh).
Patent Abstracts of Japan, vol. 10, No. 115 (M-474) (2172), Apr. 30, 1986 & JP-A-60 245 529 (Sumitomo Jukikai Kogyo).
Patent Abstracts of Japan, vol. 11, No. 218 (M-607) (2665), Jul. 15, 1987 & JP-A-62 035 820 (Meiki Co.).
Patent Abstracts of Japan vol. 12 #296 (M731) (3143) Aug. 12, 1988 & JP-A-63-74618 (Hitachi).

*Primary Examiner*—Charles S. Bushey
*Attorney, Agent, or Firm*—Philip M. Shaw, Jr.

[57] ABSTRACT

A metal mold device for molding a substrate includes a fixed metal mold, a movable metal mold mounted facing the fixed metal mold for being moved towards and away from the fixed metal mold and for defining a mold cavity between it and the fixed metal mold, a stamper mounted on at least one of the fixed metal mold or the movable metal mold and arranged within the mold cavity, a positioning unit provided on the metal mold on which the stamper is mounted for positioning the loading position of the stamper, and a stamper supporting unit provided on the metal mold on which the stamper is mounted for supporting the stamper by suction. The stamper is positioned by the positioning member and held under suction by the stamper suction unit so that it may be mounted in position on the fixed metal mold or the movable metal mold to permit a disc substrate to be molded highly accurately.

7 Claims, 12 Drawing Sheets

METAL MOLD DEVICE FOR MOLDING A DISC SUBSTRATE

BACKGROUND OF THE INVENTION

1. Field of the Invention

This invention relates to a metal mold device for molding a substrate of a disc as a recording medium for information signals, such as an optical disc or a magneto-optical disc. More particularly, it relates to a metal mold device for molding a disc substrate by molding synthetic resin, such as polycarbonate resin, and a method for molding a disc substrate by means of the metal mold device.

2. Description of Related Art

An optical disc has hitherto been proposed which makes use of a disc substrate formed of synthetic resin such as light-transmitting polycarbonate resin. This type of the optical disc may be exemplified by a read-only type disc and a magneto-optical disc with which it is possible to re-write previously recorded information signals. The read-only optical disc includes a disc substrate having its major surface formed with a pattern of recesses and lands corresponding to information signals, such as predetermined musical sound signals, or pits, and a reflective film produced by e.g. vacuum deposition of aluminum of the like material. The overwrite type magneto-optical disc, capable of re-writing information signals, has a signal recording layer having a magnetic film on its major surface on which a pre-groove constituting a recording track for recording predetermined information signals is formed.

The disc substrate, formed of synthetic resin for constituting the optical disc or the magneto-optical disc as described above, is produced using a metal mold device for injection molding.

The metal mold device for molding the disc substrate is constituted as shown in FIG. 1. The metal mold device is made up of a fixed metal mold 1 and a movable metal mold 2 placed facing the fixed metal mold. A mold cavity 4 corresponding in shape to the disc substrate 30 to be molded is defined between the fixed mold 1 and the movable mold 2 making up a metal mold 3.

At a mid position of the fixed metal mold 1, there is provided a sprue busing 4 for introducing synthetic resin, such as molten polycarbonate resin, from a injection molding machine into the mold cavity 4. A resin injection port 6 is bored through the sprue bushing 5. The molten synthetic resin, supplied from the injection molding machine, is injected into the mold cavity 4 through the resin injection port 6.

A stamper 7 molding the pattern of recesses and lands corresponding to the information signals, or pits, and a pre-groove constituting a recording track(s), is loaded on a surface of the fixed mold 1 defining the mold cavity 4. The stamper 7 is in the form of a disk having a central aperture 7a and is attached to the fixed metal mold by having the rim of the central aperture 7a supported by an inner stamper holder 8 and by having its outer periphery supported by an outer stamper holder 9.

Meanwhile, the stamper holder 8, supporting the rim of the central aperture 7a at an inner side of the stamper 7, is loaded on the fixed metal mold 1 by being fitted to the outer periphery of a stamper holder support 10 which is fitted to an outer side of the sprue bushing 5. An annular stamper supporting pawl 11 is formed at a radially outer end of the stamper holder 8 for supporting the rim of the central aperture 7a of the stamper 7.

The inner stamper holder 8 is pressed and supported against a lateral surface 13a of a flange 13 of the stamper holder support 10 by a stamper holder fixing unit 12 which is passed through the inside of the fixed metal support 1. The inner stamper holder fixing unit 12 is made up of a holder fixing lever 14 traversing the fixed metal mold 1, a threaded part 15 connected to the holder fixing lever 14 and adapted for reciprocating the holder fixing lever 14 in the directions shown by arrows A and B in FIG. 1, and a knob 16 for rotating the threaded part 15. A wedge-shaped engaging supporting part 17 having an inclined lateral side is formed at a distal end of the holder fixing lever 14. The engaging supporting part 17 is engaged in a wedge-shaped mating engaging recess 18 formed on an outer lateral side of the inner stamper holder 8.

In the above-described construction of the inner stamper holder fixing unit 12, the threaded part 15 is rotated by means of the knob 16 for introducing the holder fixing lever 14 in the direction of arrow A in FIG. 1 for progressively engaging the wedge-shaped engaging supporting part 17 in the mating wedge-shaped engaging recess 18 for causing the inner stamper holder 8 to bear against the flange 3 of the stamper holder support 10. The stamper 7, having its inner edge supported by the stamper-supporting pawl 11, is loaded in position by being thrust and supported against a stamper contact surface 1a of the fixed metal mold 1.

The fixed metal mold 1 is also provided with an inner stamper holder releasing unit 19 for releasing the pressure support of the stamper 7 relative to the fixed metal mold 1 by the inner stamper holder 8. Similarly to the above-described inner stamper fixing unit 12, the inner stamper holder releasing unit 19 is made up of a holder releasing lever 20 traversing the fixed metal mold 1, a threaded part 21 connected to the holder releasing lever 20 and adapted for reciprocating the holder releasing lever 20 in the directions shown by arrows D and E in FIG. 1, and a knob 22 for rotating the threaded part 21. A wedge-shaped releasing part 23 having an inclined lateral side is formed at a distal end of the releasing lever 20. The releasing part 23 is engaged in a notch-shaped engaging surface 24 formed on an end face of the inner stamper holder 8.

For dismounting the inner stamper holder 8 fitted on the outer periphery of the stamper holder support 10 for detaching the stamper 7 from the fixed metal mold 1, the holder fixing lever 14 is receded in a direction shown by arrow B in FIG. 1 for disengaging the engaging supporting part 17 from the engaging recess 18. The threaded part 21 is then rotated by means of the knob 22 for advancing the holder releasing lever 20 in a direction shown by an arrow D in FIG. 1 for progressively engaging the releasing part 23 with the inclined surface 24 for moving the inner stamper holder 8 in the direction shown by arrow F in FIG. 1 for releasing the stamper from the stamper supporting pawl 11. The stamper 7 may now be detached from the fixed metal mold 1.

The movable metal mold 2, arranged facing the fixed metal mold 1 for being moved towards and away from the fixed metal mold 1, is provided with a sleeve 25 which is reciprocably mounted at the center of the mold cavity 4 for releasing a molded disc substrate 30. A punch 26 for punching a center hold 30a in the disc substrate 30 is reciprocably mounted at the center of the sleeve 25.

For molding the disc substrate 30, using the above-described metal mold device, the movable mold 2 is caused to approach the fixed metal mold for establishing a mold clamping state. In this mold clamping state, the molten synthetic resin, such as molten polycarbonate resin, supplied from the injection molding machine, is injected and charged into the mold cavity 4 via the resin injection port 6 of the sprue bushing 5. The movable mold 2 is caused to approach closer to the fixed metal mold 1 for compressing the synthetic resin charged into the mold cavity 4 under cooling for molding the disc substrate 30 corresponding in shape to the mold cavity 4. The punch 26 is then moved for boring the centering aperture. The movable mold 2 is moved away from the fixed mold 1 for mold opening, at the same time that the sleeve 25 is protruded towards the fixed metal mold 1 for releasing the molded disc substrate 30 out of the metal mold 3. The disc substrate 30 is taken out of the metal mold 3, using a suitable take-out unit, for forming the disc substrate 30 shown in FIG. 2.

In the above-described conventional metal mold device, since the stamper 7 is caused to bear against the fixed metal mold 1 by the inner stamper holder 8 provided with the stamper supporting pawl 11 adapted to support the rim of the central aperture 7a, the operation of attaching the stamper 7 to the fixed metal mold 1 is complicated. That is, for attaching the stamper 7 to the fixed metal mold, the inner stamper holder 8 is engaged in the stamper holder support 10 and the inner stamper holder fixing unit 12 is operated to shift the inner stamper holder 8 for thrusting the stamper 7 against the fixed metal mold 1 by the stamper supporting pawl 11, resulting in a complicated stamper attachment operation.

On the other hand, if the machining tolerance of the inner stamper holder 8 or the stamper holder support 10 to which the inner stamper holder 8 is fitted is not maintained within a narrow limit, the center of the stamper 7 may be offset with respect to the center of the disc substrate 30 to be molded. If the center of the stamper 7 is not in correct registration with the center of the disc substrate 30, the center of the pre-groove for forming the concentric or spiral recording track(s) or pits on the major surface of the disc substrate 30 by the stamper 7 is offset from the center of the disc substrate 30, so that the molded product cannot be used as a disc substrate for an optical disc.

Besides, the stamper 7 is caused to bear against the fixed metal mold 1 by the stamper supporting pawl 11 of the inner stamper holder 8, so that, if the thrusting force exerted by the stamper supporting pawl 11 is excessive, the stamper 7 tends to be distorted or deformed, so that rate of rejected products is likely to be increased.

In addition, the metal mold is complicated in structure by the provision of the inner stamper holder fixing unit 12 for fixing and supporting the inner stamper holder 8 or the inner stamper holder releasing unit 19 for detaching the inner stamper holder 8 from the fixed metal mold 1.

Above all, in the above-described arrangement in which the rim of the central aperture 7a of the stamper 7 is supported by the stamper supporting pawl 11 of the inner stamper holder 8 for attaching the stamper 7 to the fixed metal mold 1, the stamper supporting pawl 11 is protruded towards the disc substrate molding surface 7a of the stamper 7, so that the entire area of the molding surface 7a cannot be utilized effectively. That is, an annular groove 31 having a width corresponding to the stamper supporting pawl 11 is formed on an inner periphery of the disc substrate 30, as shown in FIG. 2, so that a signal recording region s in which a pre-groove for forming the pits or recording track(s) is formed cannot be extended to an area $S_1$ at an inner most region of the disc substrate 30.

On the other hand, when the disc substrate 30 is formed as an optical disc, a reflective film or a signal recording layer 33 is deposited in the signal recording area s of the disc substrate 30 in which the pits or the pre-groove is formed, as shown in FIG. 3. Besides, a protective film 34 formed of a synthetic resin is deposited on the reflective film or the signal recording layer 33. The function of the protective film 34 is to prevent air or moisture from being contacted with and attacking the reflective film or the signal recording layer 33.

Consequently, the protective film 34 needs to be firmly deposited on the disc substrate 30 so as not to be peeled off from the disc substrate 30. Besides, the protective film 34 needs to cover the reflective film or the signal recording layer 33 with a thickness large enough to prevent intrusion of air or moisture into the reflective film or the signal recording layer 33.

However, if the disc substrate 30 is designed for a small-sized optical disc such that the signal recording region 32 is extended to the inner most area of the disc, the annular groove 31 of a larger width is formed at the inner side of the disc substrate 30 so that the protective film 34 at the inner most side of the disc substrate 30 can be deposited on the planar major surface of the disc substrate 30 only by a narrow width W. Consequently, the reflective film or the signal recording layer 33 cannot be covered positively by the protective layer 34 so that the reflective film or the signal recording layer 33 cannot be reliably protected against chemical attack by air or moisture.

On the other hand, the disc substrate 30 has a centering aperture 35 engaged by a centering member provided on a disc table of a disc rotating and driving unit adapted for rotating and driving the optical disc prepared from the disc substrate 30. Besides, an annular projection or boss 36 defining the centering aperture 35 is formed at a surface of the disc substrate 30 opposite to the surface on which the signal recording layer 33 is formed. The function of the projection 36 is to set the loading height of the disc on the disc table as well as to permit disc rotation in a horizontal position with respect to the center of rotation of the disc table. Consequently, the end face of the projection 36 functions as a reference plane 37 for enabling the disc to be attached to the disc table in a horizontal position with respect to the center of rotation, so that it is a planar surface for maintaining correct horizontality with respect to the center of rotation.

Meanwhile, the centering aperture 35 provided in the disc substrate 30 is bored by a punch reciprocated in the mold cavity of the metal mold device. The aperture 35 is usually bored by actuating the punch immediately after the disc substrate 30 is molded by injecting the synthetic resin into the mold cavity. Above all, if the centering aperture 35 is bored while the synthetic resin injected into the mold cavity is yet in the molten sate and is not completely cured, punching burrs 38 tend to be produced in the proceeding direction of the punch.

If these burrs 38 are produced on the loading reference surface 37 at the end of the projection 36 or on the loading reference surface at the inner surface of the centering aperture 35 engaged by the centering member, the centering aperture 35 is worsened in true circularity, while the reference surface 37 cannot be planar, as a result of which the optical disc produced from the disc substrate 30 cannot be loaded on the disc table with correct centering and positioning and consequently the disc cannot be maintained in the correctly horizontal state with respect to the center of rotation of the disc table to give rise to failure in recording or reproduction.

OBJECTS AND SUMMARY OF THE INVENTION

It is therefore an object of the present invention to provide a metal mold device enabling high-precision molding of a disc substrate for a small-sized optical disc designed for high density recording of information signals, such as an optical disc having a diameter of 64 mm and capable of recording audio signals for 74 minutes, and a method for fabricating the disc substrate.

It is another object of the present invention to provide a metal mold device for molding a disc substrate whereby the operation of loading a stamper adapted for forming pre-pits or a pre-groove for forming the recording track on the disc substrate on the metal mold may be achieved easily and with correct positioning with respect to the metal mold.

It is a further object of the present invention to provide a metal mold device whereby the pits or the pre-groove for forming the recording track(s) may be molded without offset and whereby failure in molding the disc substrate may be eliminated.

It is a further object of the present invention to provide a metal mold device for molding a disc substrate enabling a disc substrate to be molded for providing the optical disc in which the signal recording region may be formed over a wider area extending to the inner most region of the disc, the protective layer covering the reflective film or the signal recording layer may be deposited reliably and in which the reflective film or the signal recording layer may be protected reliably.

It is further object of the present invention to provide a metal mold device for molding a disc substrate having a simplified structure.

It is yet another object of the present invention to provide a method for forming a disc substrate for producing an information recording disc, in which the inner peripheral surface of the centering aperture of the disc substrate engaged by a centering member for centering the disc with respect to the center of rotation of the disc table when the disc is set on the disc table and the horizontal loading reference surface of the disc with respect to the disc table may be formed highly accurately to permit the disc to be loaded in position on the disc table, and in which stable disc rotation may be assured without producing failure in the recording or reproduction of information signals.

For accomplishing the above objects, the present invention provides a metal mold device for molding a substrate comprising a fixed metal mold, a movable metal mold mounted facing said fixed metal mold for being moved towards and away from said fixed metal mold and for defining a mold cavity between it and said fixed metal mold, a stamper mounted on at least one of said fixed metal mold or said movable metal mold and arranged within said mold cavity, and positioning means provided on the metal mold on which said stamper is mounted for positioning the loading position of said stamper, and stamper supporting means provided on the metal mold on which said stamper is mounted for supporting said stamper by suction.

The stamper supporting unit may be a vacuum suction unit or a magnetic suction unit taking advantage of a magnetic force of attraction.

The present invention also provides a method for forming a disc substrate having a bottomed centering hole and a reference loading plane for disc rotating and driving means, said reference loading plane being substantially parallel to the planar region on which the recording and/or reproducing light beam is incident, said reference loading plane being projected from said planar region, comprising the steps of injecting synthetic resin into the mold cavity of said metal mold device for forming a bottomed centering hole, and punching at least a part of said centering hole by a moveable member protruded into said mold cavity for forming a through-hole.

Other objects and advantages of the present invention will become apparent from the following description of the preferred embodiments and the appended claims.

DETAILED DESCRIPTION OF THE PREFERRED EMBODIMENTS

A first embodiment of a metal mold device for molding a disc substrate according to the present invention will be hereinafter explained.

Figure 1:
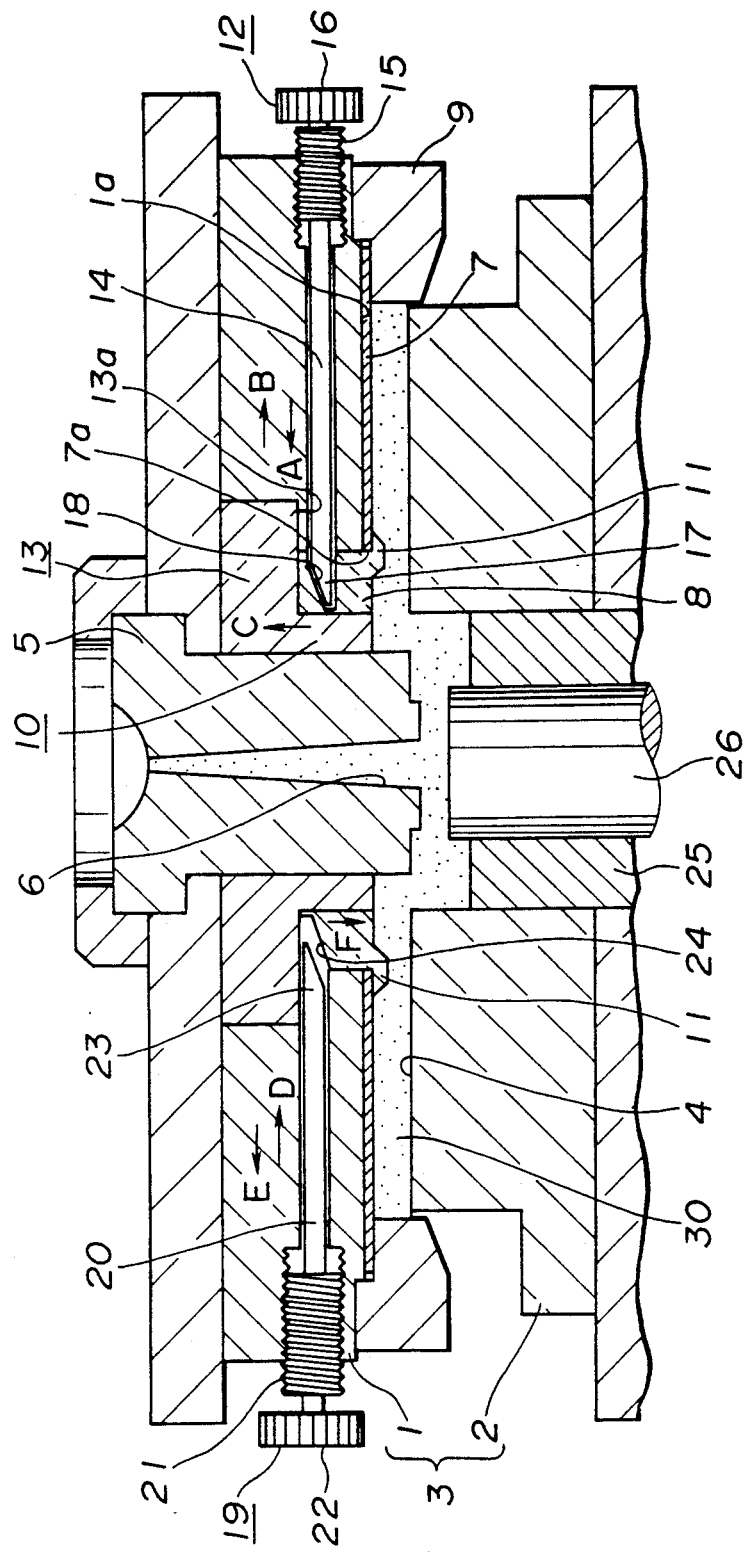
FIG. 1 is a schematic cross-sectional view showing a conventional metal mold device for molding a disc substrate.
Figure 2:
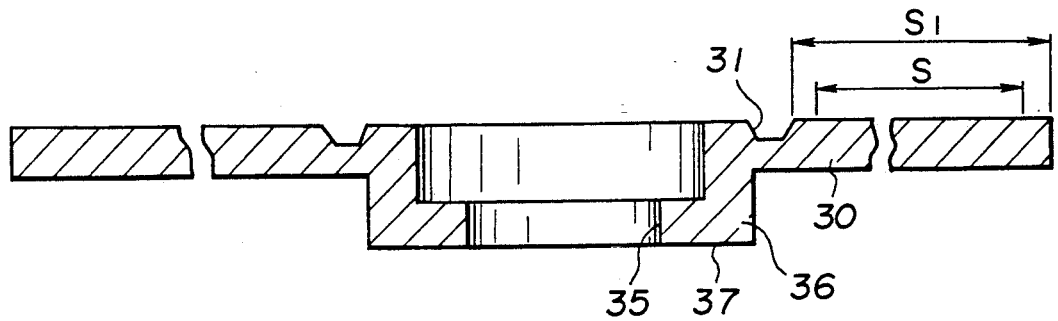
FIG. 2 is a cross-sectional view showing a disc substrate molded by the conventional metal mold device.
Figure 3:
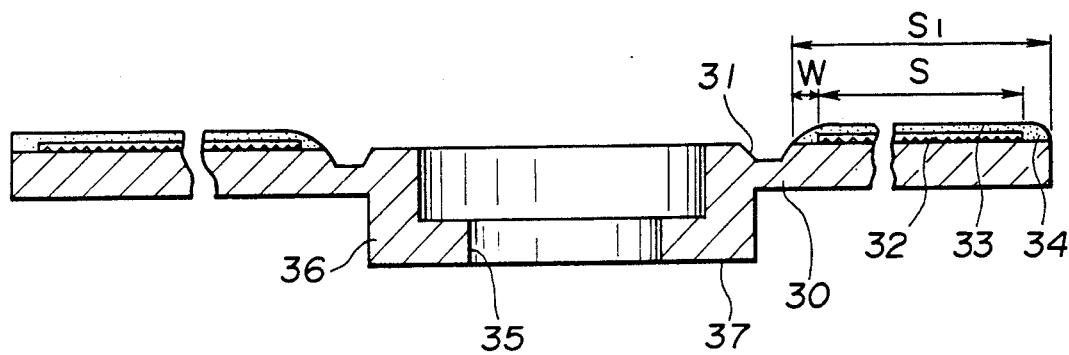
FIG. 3 is a cross-sectional view showing the state in which a protective layer is formed for covering a signal recording layer deposited on a disc substrate molded by the conventional metal mold device.
Figure 4:
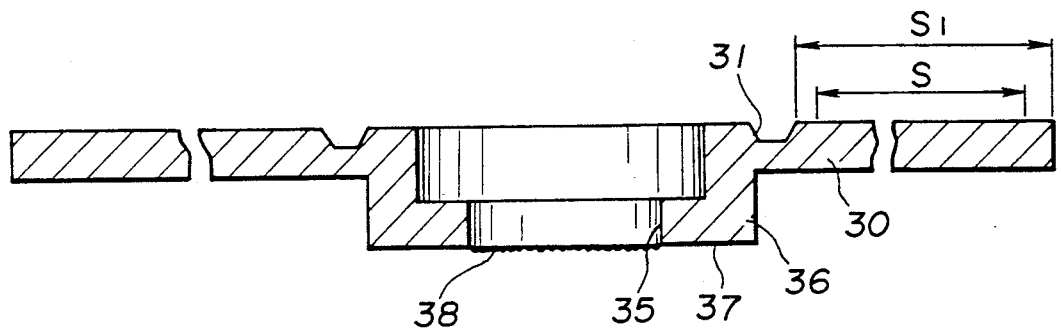
FIG. 4 is an enlarged partial cross-sectional view showing the centering aperture of the conventional magneto-optical disc.
Figure 5:
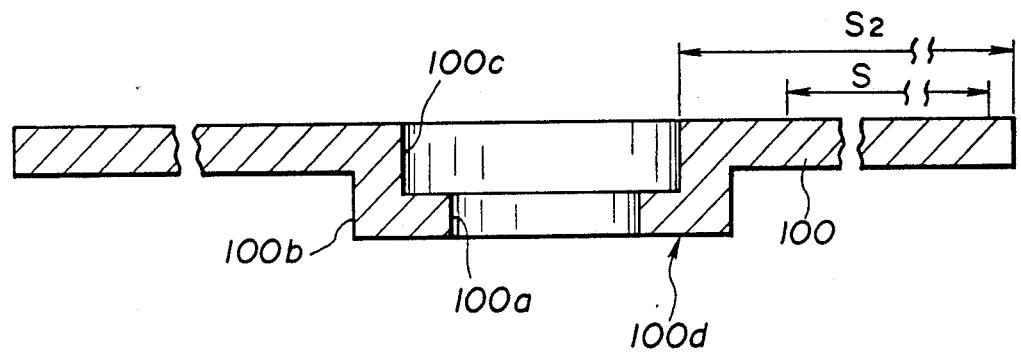
FIG. 5 is a longitudinal cross-sectional view showing a disc substrate molded by a metal mold device for molding a disc substrate according to the present invention.

The present metal mold device for molding the disc substrate is used for molding a disc substrate 100, shown in FIG. 5, from a synthetic resin having light-transmitting properties, such as polycarbonate resin. The disc substrate 100 is used for fabricating an optical disc or the like shown in FIG. 6. The optical disc may be a read-only disc or a magneto-optical disc in which the information signal once recorded on the disc may be re-recorded a desired number of times. The optical disc has a diameter of 64 mm and is capable of recording audio signals continuing for at least 74 minutes.

Figure 7:
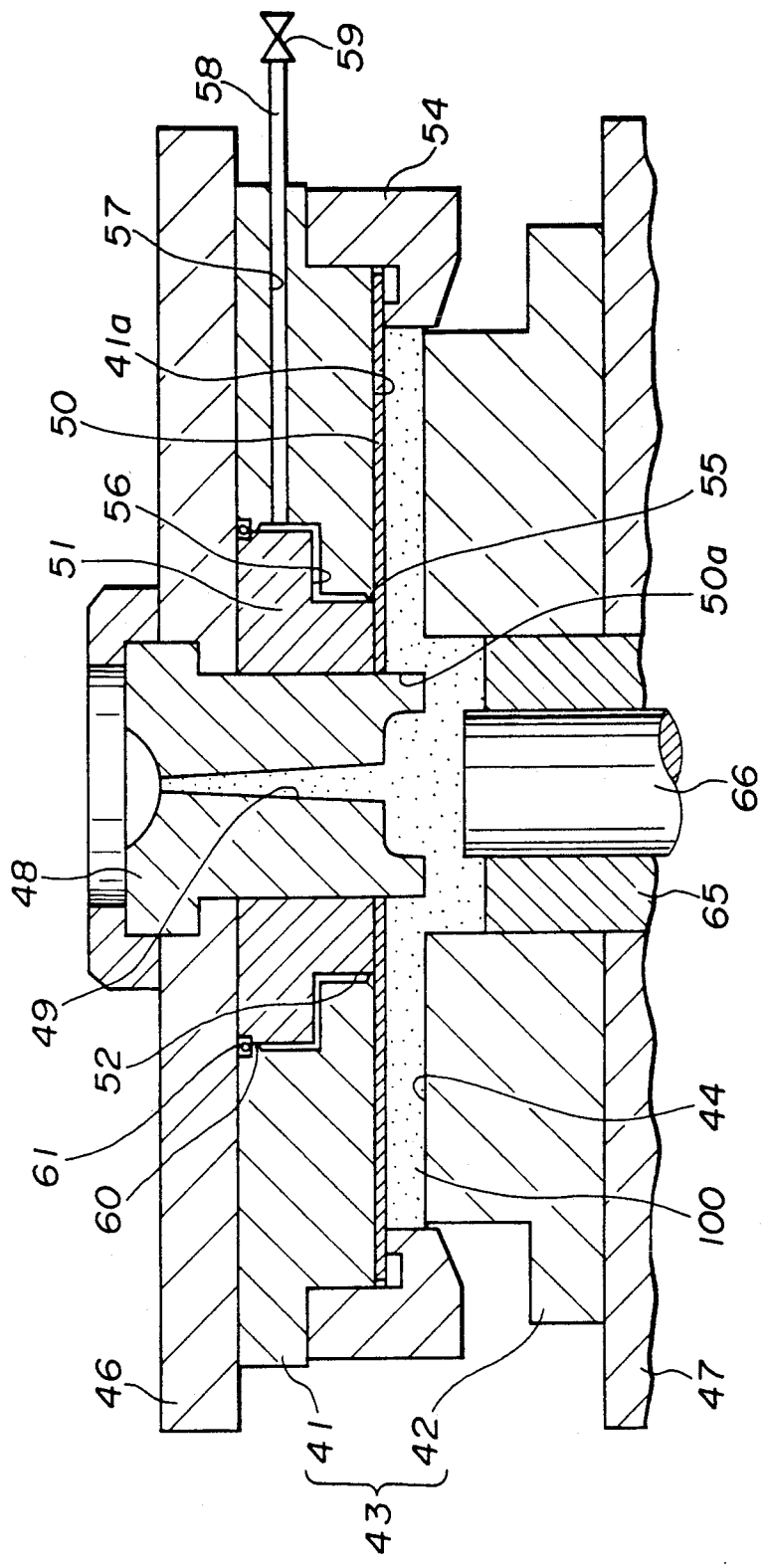
FIG. 7 is a longitudinal cross-sectional view showing a first embodiment of a metal mold device for molding a disc substrate according to the present invention.

The disc substrate 100 is molded by so-called injection molding by means of a metal mold device for molding a disc substrate according to the present invention. The metal mold device includes a metal mold 43 made up of a fixed metal mold 41 and a movable metal mold 42 facing the fixed metal mold, as shown in FIG. 7. A mold cavity 44 corresponding in shape to the disc substrate 100 is defined between a stamper loading surface 41a at the lower surface of the fixed metal mold 41 and the upper surface of the movable metal mold 42 when the molds 41 and 42 are caused to bear against each other. That is, the mold cavity 44 is substantially in the form of a disc to be molded.

The fixed metal mold 41 is supported with respect to a fixed mounting block 46 by mounting means, not shown. The movable metal mold 42, adapted to be moved towards and away from the fixed metal mold 41, is supported by suitable mounting means, not shown, on a movable mounting block 47 which is driven by suitable driving means, also not shown.

At the center of the fixed metal mold 41, that is at the center of the stamper loading surface 41a defining the mold cavity 44 of the fixed mold 41, an inserting through-hole is formed in a direction at right angles to the stamper loading surface 41a. A substantially toroidal-shaped sprue bushing supporting holder 51 is inserted into the through-hole of the fixed metal mold 41. A substantially cylindrical sprue bushing 48 is fitted into the spruce bushing supporting holder 51. The synthetic resin material, such as molten polycarbonate resin, is introduced from an injection device, not shown, into the mold cavity 44 through the sprue bushing 48 via a resin injection port 49. The sprue bushing 48 has its distal end protruded slightly below the stamper loading surface 41a of the fixed metal mold 41. That is, the sprue bushing 48 has its distal end introduced into the mold cavity 44 so that its end face into which the resin injection port 49 is opened is introduced into the mold cavity 44. The sprue bushing supporting holder 51 is stepped and has its forward end facing the mold cavity 44 reduced in diameter while having its rear end formed as a flange. The distal end of the sprue bushing supporting holder 51 is flush with the stamper loading surface 41a of the fixed metal mold 41 for delimiting part of the inner surface of the mold cavity 44. The distal end of the sprue bushing supporting holder 51 is spaced apart from the stamper loading surface 41a by a small gap which is toroidal-shaped and surrounds the forward end of the sprue bushing supporting holder 51.

A stamper 50 for defining a pattern of recesses and lands corresponding to information signals, or a pregroove defining the recording track(s), is loaded on the stamper loading surface 41a delimiting the mold cavity 44 of the fixed mold 41. The stamper 50 is formed of nickel or the like material and has the shape of a thin disk having a central aperture 50a.

The stamper 50 is positioned by having the distal end of the sprue bushing 48 fitted into its central aperture 50a. That is, the inside diameter of the central aperture 50a corresponds to the outside diameter of the sprue bushing 48. The stamper 50 has its outer peripheral region supported by an outer stamper holder 54 mounted on the fixed metal mold 41. The outer stamper holder 54 is substantially toroidal-shaped and mounted on the lower outer periphery of the fixed metal mold 41 for delimiting the outer rim of the mold cavity 44.

The fixed metal mold 41 is provided with a stamper suction unit operated as stamper suction means. The stamper suction unit is adapted for discharging air between the fixed metal mold 41 and the stamper 50 by a vacuum pump, not shown, via a suction slit 55 which is the small gap defined between the outer surface of the sprue bushing supporting ring 51 and the inner wall of the through-hole of the fixed metal mold 41. An air channel 56 is connected to the outside via an air duct 57 bored through the fixed metal mold 41. The air duct 57 is extended radially through the mold cavity 44 from the center to the outer lateral surface of the fixed metal mold 41.

An air conduit 58 is mounted on the outer lateral side of the fixed metal mold 41 in communication with the air duct 57 and is connected to vacuum pump, not shown, via a valve 59. When the valve 59 is open, the vacuum pump sucks air between the stamper loading surface 41a of the fixed metal mold 41 and the stamper 50 via air conduit 58, air channel 56, air duct 57 and the suction slit 55 to discharge the sucked air to the outside. With the valve 59 closed, the space defined between the stamper loading surface 41a of the fixed metal mold 41 and the stamper 50 is hermetically sealed to the outside under a state of a reduced pressure. The stamper 50 is held by suction against the stamper loading surface 41a of the fixed metal mold 41. The movable metal mold 42, arranged facing the fixed metal mold 41 for being moved towards and away from the fixed metal mold 41, is provided with a sleeve 65 which is provided at the center of the mold cavity 44 and which is adapted for releasing the molded disc substrate 100. A punch 66 for boring a centering aperture 100a of a disc substrate 100 is reciprocably mounted at the center of the sleeve 65.

The sleeve 65 is reciprocably supported with respect to the movable metal mold 42 and has its distal end facing the mold cavity 44 receded slightly from the upper surface of the movable mold cavity 44 into the inside of the movable metal mold 42. The punch 66 has its distal end facing the mold cavity 44 extended slightly beyond the distal end of the sleeve 65.

For forming the disc substrate 100 by the above-described metal mold device for fabricating the disc substrate, the movable metal mold 42 is caused to bear against the fixed metal mold 41 for defining the mold cavity 44. The molten synthetic material, such as polycarbonate resin, is injected and charged into the mold cavity 44 by the injection apparatus, not shown, via resin injection port 49 of the sprue bushing 48. The resin material is caused to flow from the center towards the periphery within the mold cavity 44. After the mold clamping operation of displacing the movable metal mold 42 towards the fixed metal mold 41 for compressing the resin material charged into the mold cavity 44, the mold device is cooled. This causes the resin material charged into the mold cavity 44 to be solidified to form the disc substrate 100 corresponding in shape to the mold cavity 44, as shown in FIG. 5.

The punch 66 is then protruded towards the fixed metal mold 41 for boring the centering aperture 100a. Next, the movable metal mold 42 is displaced away from the fixed metal mold 41, while the sleeve 65 is protruded towards the fixed metal mold 42, by way of performing a mold-opening operation, for releasing the molded disc substrate 100 from the metal mold 43. The disc substrate 100 is detached from the fixed metal mold 41 for completing the molding of the disc substrate 100.

The disc substrate 100 has its one major surface as a signal recording surface molded by the stamper 50. A chuck plate attachment recess 100c is formed at a mid part of the major surface of the disc substrate 100. The chuck plate attachment recess 100c is molded by the end part of the sprue bushing 48 intruded into the mold cavity 44. At a mid part of the other major surface of the disc substrate 100 is formed a ring-shaped boss 100b which has been molded by the central through-hole in the movable metal mold 42 and the distal end of the sleeve 65 and which circumscribes the chuck plate attachment recess 100c. The outer peripheral surface of the boss 100b and the end face of the boss 100b molded by the distal end of the sleeve 65 represent a reference surface 100d for defining the horizontal position of the optical disc produced from the disc substrate 100.

Figure 6:
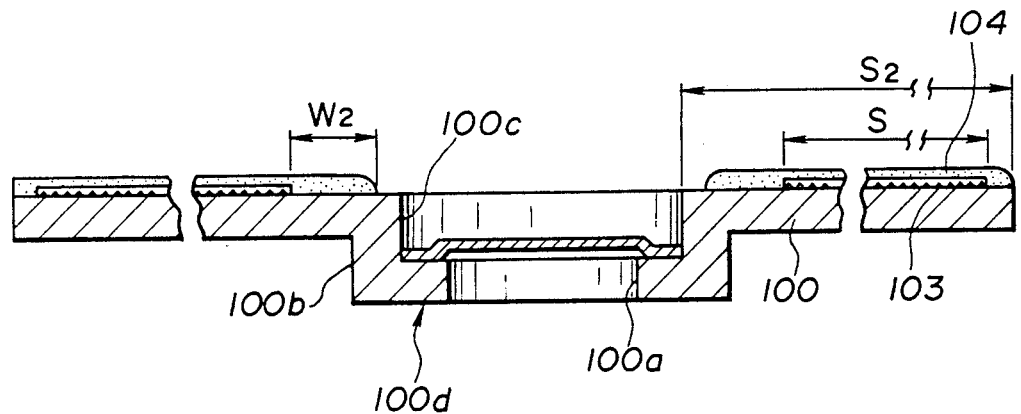
FIG. 6 is a longitudinal cross-sectional view showing an optical disc produced from the disc substrate shown in FIG. 5.

In the read-only disc produced from the disc substrate 100, a pattern of recesses and lands 103, corresponding to information signals, is formed on one of the major surfaces of the disc substrate 100, as shown in FIG. 6, and a reflective film formed of aluminum etc. is deposited on the pattern 103 by sputtering or vacuum deposition. The pattern 103 is formed by the stamper 50.

In the read-only disc produced from the disc substrate 100, a pre-groove 103 defining a recording track(s) for recording information signals is formed on one of the major surfaces of the disc substrate 100, and a signal recording layer of a magnetic material is deposited on the pre-groove 103. The pre-groove 103 is formed by the stamper 50.

With the present metal mold device for fabricating the disc substrate, the entire disc substrate molding surface of the stamper facing the mold cavity 44 may be utilized effectively. That is, in the disc substrate 100, the entire surface of the major surface of the disc substrate 100 extending from its outer periphery as far as the rim of the chuck plate attachment recess 100c as indicated by arrow $S_2$ is a planar surface, on which the pattern of recesses and lands may be formed, as shown in FIG. 6. That is, with the present disc substrate 100, the area in which the signal recording region can be formed may be extended to the inner most area of the disc substrate 100.

On the major surface of the optical disc, produced from the disc substrate, a protective film 104 of a synthetic resin is deposited on the reflective film which is formed on the signal recording region consisting in the pattern of recesses and lands 103 as indicated by arrow S in FIG. 6. The function of the protective film 104 is to interrupt contact of moisture contained in air with the reflective film etc. to prevent its corrosion. It is necessary for the protective film 104 to be thick enough to interrupt contact of the moisture in air with the reflective film etc. while it is also necessary for the protective film to be deposited in tight contact with the disc substrate 100 so as not to be peeled from the disc substrate 100. With the present disc substrate 100, the width of a deposition region of the protective film 104 on the disc substrate 100, that is the distance from the inner periphery of the signal recording region to the rim of the chuck plate attachment recess 100c, may be increased to assure intimate contact of the protective film 104 with the disc substrate 100 to assure protection of the reflective film etc. by the protective film 104.

With the optical disc produced from the disc substrate 100, the chuck plate 100e is received within the chuck plate attachment recess 100c. The chuck plate 100e is formed of a magnetic material, such as metal, in the form of a disk. The chuck plate 100e is attracted by a magnet of a magnet chucking system of a recording/reproducing apparatus making use of the optical disc for holding the optical disc.

Figure 8:
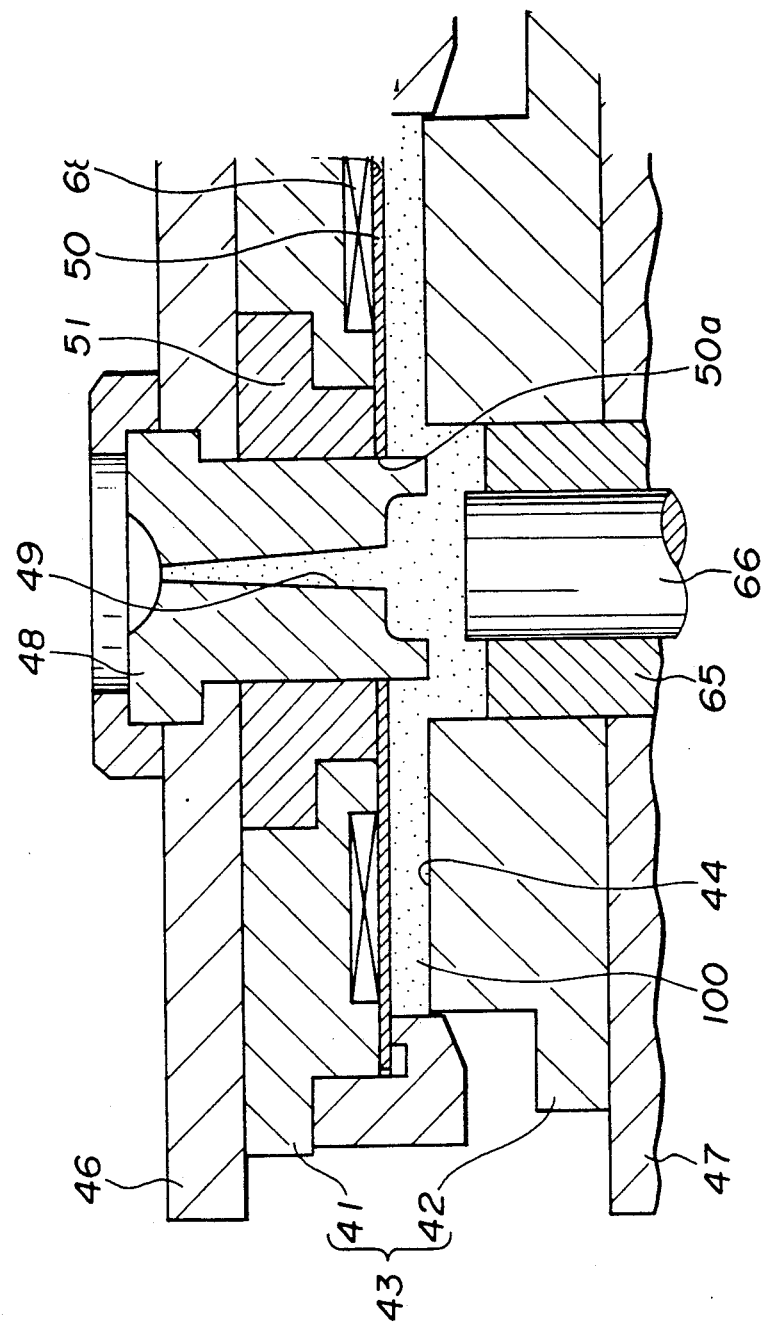
FIG. 8 is a longitudinal cross-sectional view showing a modification of the first embodiment of the metal mold device shown in FIG. 7.

In the metal mold device for molding the disc substrate according to the present invention, the stamper suction means is not limited to the stamper suction unit employing the vacuum pump as shown in the above described embodiment. That is, a magnet 68 which is arranged flush with the stamper loading surface 41a to form a part of the stamper loading surface 41a of the fixed metal mold 41 as shown in FIG. 8 may also be used as the stamper suction means.

In the present metal mold device for fabricating the disc substrate, the stamper 50 is loaded on the fixed metal mold 41 by having its outer peripheral side supported by the outer stamper holder 54 and by having its major surface attracted and held by the magnet 68. If the magnet 68 is an electro-magnet, the stamper 50 may be detached more easily from the fixed metal mold 41.

The metal mold device for fabricating the disc substrate according to the present invention is not limited to the above-described arrangements in which the stamper 50 is loaded only on the fixed metal mold 41 for molding the disc substrate 100, but may be so arranged that the stamper 50 may be loaded on the movable metal mold 42. In this case, a positioning projection, not shown, is provided on the movable metal mold 42 for engaging in the central aperture 50a of the stamper 50 for positioning the stamper 50 by the positioning projection.

In the above-described metal mold device for fabricating the disc substrate according to the present invention, the stamper has the inner edge of its central aperture 50a positioned by the sprue bushing 48, while being attracted and supported by the stamper suction unit or by the magnet 68. In this manner, with the present metal mold device for molding the disc substrate, the operation of attaching the stamper 50 to the fixed metal mold 41 is facilitated.

Besides, in the present metal mold device for molding the disc substrate, the stamper 50 is accurately positioned by the sprue bushing 48, with its central region in accurate registration with the center of the disc substrate 100 molded by the present metal mold device. Therefore, the disc substrate 100 may be molded by the present metal mold device in a manner desirable for an optical disc without producing offsets of the center of curvature of the spirally extending pattern of recesses and lands, or rows of pits, formed on one of the major surfaces of the disc substrate 100, from the center of the disc substrate 100.

Besides, with the present metal mold device for fabricating the disc substrate, the molded disc substrate is not distorted because the stamper 50 is attracted and supported by the stamper suction device or by the magnet 68. Consequently, with the present metal, mold device for fabricating the disc substrate, the disc substrate 100 with desirable properties may be molded, while the structure of the mold device may be simplified because the stamper 50 is attracted and supported by the stamper suction unit or by the magnet 68.

A second embodiment of the metal mold device for fabricating the disc substrate according to the present invention is hereinafter explained in reference to FIGS. 9-11.

In the above described first embodiment, the stamper 50 is loaded on the stamper loading surface 41a of the fixed metal mold 41 by having the central aperture 50a engaged with the distal side of the sprue bushing 48. However, a holder may be provided on the outer periphery of the sprue bushing for supporting the sprue bushing by the fixed metal mold and for supporting the stamper so that the stamper is loaded by this holder on the metal mold. By referring to the drawings, a concrete example of the metal mold device for loading the stamper on the metal mold with the aid of the holder is hereinafter explained.

Similarly to the metal mold device of the preceding first embodiment, the metal mold device of the present embodiment is provided with a mold 143 made up of a fixed metal mold 141 and a movable metal mold 142 arranged facing the fixed metal mold 141. A mold cavity 144 corresponding in shape to the disc substrate 200 to be molded is defined between the fixed metal mold 141 and the movable metal mold 142.

The fixed metal mold 141 is supported by a fixed mounting block 146 via mounting means, not shown. The movable metal mold 142, moved towards and away from the fixed metal mold 141, is supported by mounting means, not shown, on a movable mounting block 147 driven by driving means, not shown.

The fixed metal mold 141 include, at the center of the mold cavity 144, a sprue bushing 148 for causing molten synthetic resin, such as polycarbonate resin, from the injection molding machine, to flow into the mold cavity 144. The sprue bushing 148 has a resin injection port 149. The molten synthetic resin, supplied from the injection molding machine is injected into the mold cavity 144 via the resin injection port 149.

A stamper 150 for molding the pattern of recesses and lands, or so-called pits, corresponding to information signals, or a pre-groove for defining a recording track(s), is loaded on the surface of the fixed metal mold 141 defining the mold cavity 144. The stamper 150 is shaped as a disk having a central aperture 150a.

Meanwhile, the stamper loading surface 141a on which the stamper 150 of the fixed metal mold 141 is loaded is a planar surface having a high degree of planarity.

A stamper holder 151 for positioning and supporting the stamper 150 is fitted on the outer periphery of the sprue bushing 148 arranged at the center of the fixed metal mold 141. This stamper holder 151 has an engaging projection 152 engaged in the central aperture 150a of the stamper 150 at a distal side thereof by which the stamper holder is intruded into the mold cavity 144. This engaging projection 152 is formed as a cylinder having an outside diameter substantially equal to the diameter of the central aperture 150a so that the projection 152 is tightly engaged in the central aperture 150a of the stamper 150. That is, the outer peripheral surface of the engaging projection 152 functions as a loading reference surface for setting the loading position of the stamper 150 loaded on the fixed metal mold 141. Consequently, the stamper 150 may be loaded on the fixed metal mold while being centered relative to the fixed metal mold by engaging the engaging projection 152 in the central aperture 150a.

An annular engagement guide 153, tapered towards its distal end for guiding the stamper 150 as the stamper is engaged with the engaging projection 152, is provided at the distal side of the engaging projection 152. The engagement guide 153 is not indispensable because its function is simply to guide the stamper 150 as it is engaged with the engaging projection 152.

An outer stamper holder 154 supporting the outer periphery of the stamper 150 which is loaded on the fixed metal mold 141 by engaging the engaging projection 152 of the stamper holder 151 in the centering aperture 150a is provided on the outer periphery of the fixed metal mold 141. Consequently, the stamper 150 is loaded on the stamper loading surface 141a of the fixed metal mold 141 by having the engaging projection 152 at the distal end of the stamper holder 151 engaged in the centering aperture 150a and by having the outer periphery of the stamper 150 supported by the outer stamper holder 154.

Similarly to the previously described embodiment of the metal mold device, the metal mold device of the present embodiment is also provided with a stamper suction unit for having the stamper 150 tightly supported by the stamper loading surface 141a of the fixed metal mold 141 under the vacuum suction effect.

The stamper suction unit is designed to cause the stamper 150 to bear against the stamper loading surface 141a by drawing the air between the stamper 150 and the stamper loading surface 141a of the fixed metal mold 141 by an air suction pump, not shown, via an annular gap 155 defined for facing the stamper loading surface 141a between the fixed metal mold 141 and the stamper holder 151 when the stamper holder 151 is placed for being fitted on the fixed metal mold 141.

The stamper suction unit is made up of an air channel 156 defined on the outer periphery of the stamper holder 151 in communication with the annular gap 155, an air duct formed in the fixed metal mold 141 in communication with the air channel 156 and the vacuum pump, not shown, connected to the air duct 157 via an air conduit 157 and a changeover valve 159.

In the operation of the stamper suction unit, the vacuum pump is driven, with the changeover valve 159 open, for drawing the air at the annular gap 155 between the stamper 150 and the stamper loading surface 141a of the fixed mold 141 via the air channel 156 and the air duct 157 which are in communication with each other.

Since the stamper 150 is sucked onto the stamper loading surface 141a by utilizing the vacuum suction effect, the stamper 150 is caused to bear against the stamper loading surface 141a under a substantially uniform force of suction so that the stamper 150 may be loaded on the fixed mold 141 without becoming distorted or deformed.

Meanwhile, an O-ring 161 for inhibiting air leakage is tightly fitted in an annular gap 160 defined for facing the fixed mounting base block 146 between the stamper holder 151 and the fixed metal mold 141.

The movable metal mold 142, mounted facing the fixed metal mold 141 for being moved towards and away from the fixed metal mold 141, is provided with a reciprocable sleeve 165 which is positioned at the center of the mold cavity 144 for releasing the molded disc substrate 200. A punch 166 for boring the centering aperture 200a of the disc substrate 200 is reciprocably mounted at the center of the sleeve 165.

For molding the disc substrate 200 using the above-described metal mold device, the movable mold 142 is caused to approach the fixed mold 141 for establishing a mold clamping state. In this mold clamping state, the molten synthetic resin, such as polycarbonate, supplied from an injection molding machine, not shown, is injected and charged into the mold cavity 144 via resin injection port 149 of the sprue bushing 148. The movable mold 142 is moved further towards the fixed metal mold 141 for compressing the resin charged in the mold cavity 144 by way of a mold compressing operation for molding the disc substrate 200 corresponding in shape to the mold cavity 144. The punch 166 is moved for boring the centering aperture 100a in the disc substrate 200. The movable mold 142 is moved away from the fixed metal mold 141 by way of a mold opening operation, at the same time that the sleeve 165 is protruded towards the fixed metal mold 141 for taking out the molded disc substrate 200 from the metal mold 143. The disc substrate is taken out of the metal mold 143 by a take-out device, not shown, for completing the disc substrate 200 shown in FIG. 10.

In the metal mold device of the embodiment illustrated, since the stamper 150 is caused to bear against the fixed metal mold under the vacuum suction effect, there is no necessity of providing a stamper supporting pawl which is projected towards the disc substrate molding surface 150b for supporting the inner periphery of the stamper 150 as in the above-mentioned conventional metal mold device. Only an annular groove 201 for receiving the engagement guide 153 is formed on the inner periphery of the molded disc substrate 200, as shown in FIG. 10.

Figure 9:
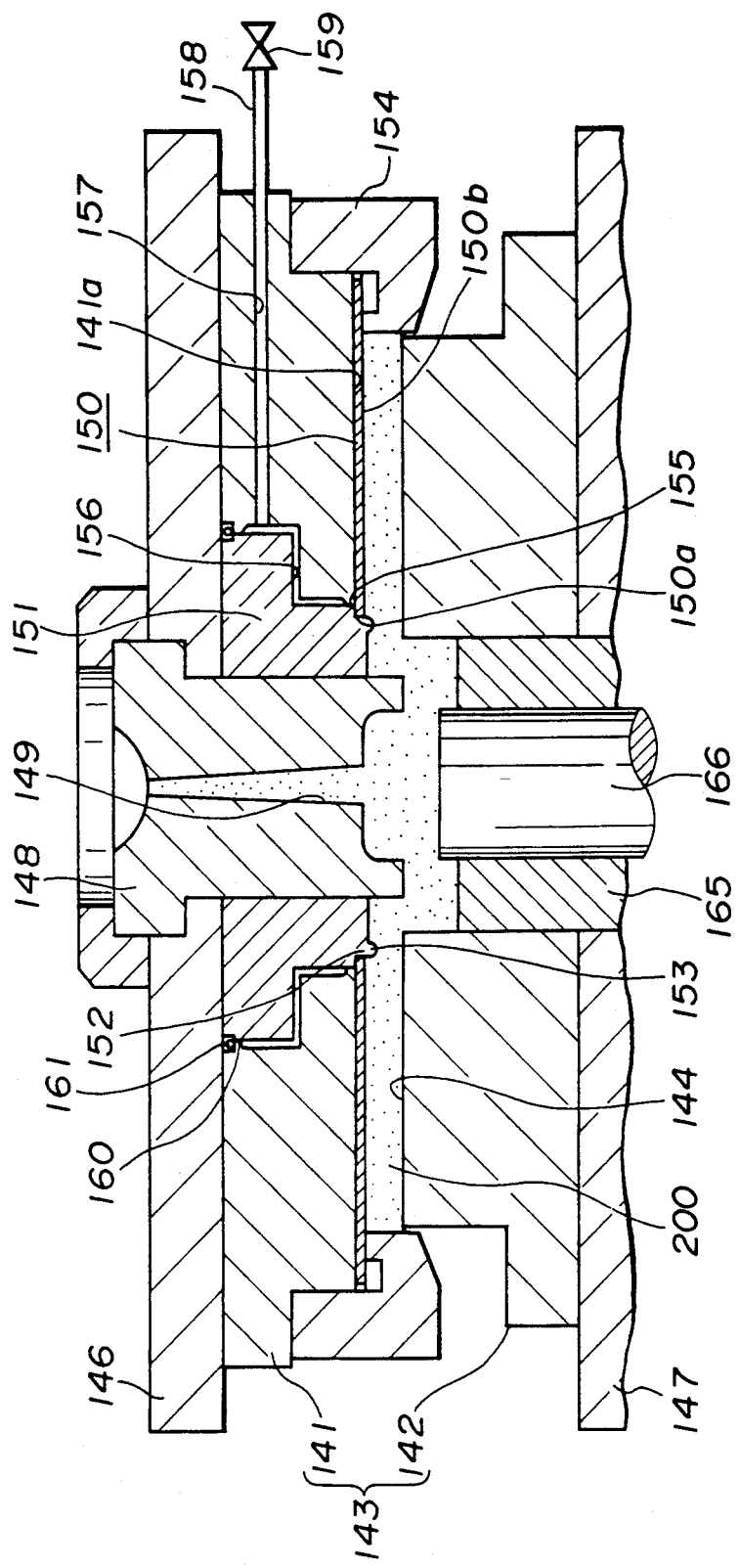
FIG. 9 is a longitudinal cross-sectional view showing a second embodiment of a metal mold device for molding a disc substrate according to the present invention.
Figure 10:
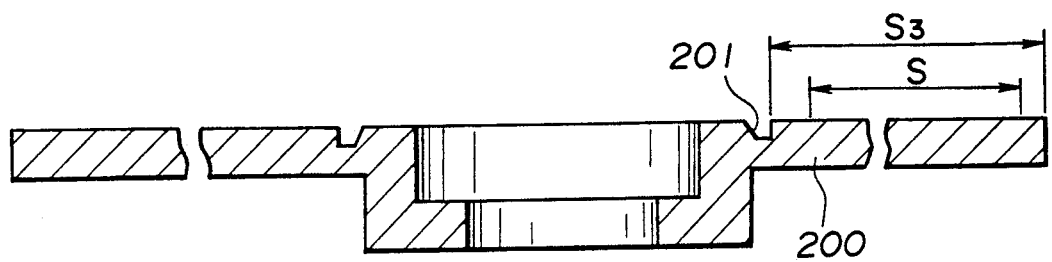
FIG. 10 is a cross-sectional view showing a disc substrate molded by the metal mold device shown in FIG. 9.
Figure 11:
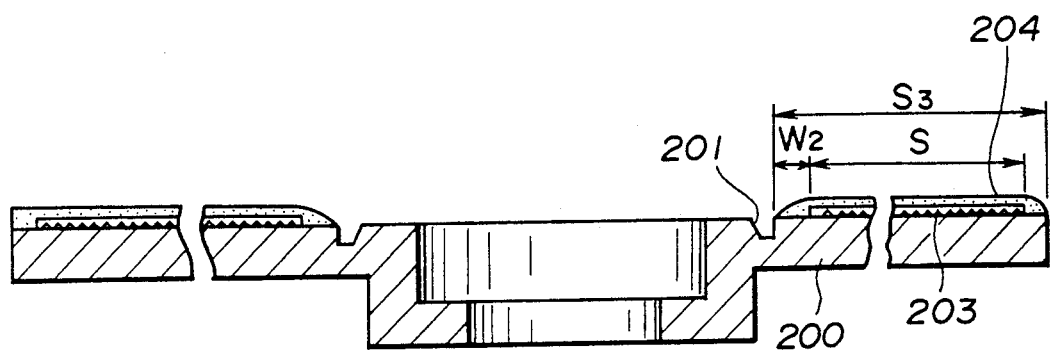
FIG. 11 is a cross-sectional view showing the state in which a protective layer is provided for covering the signal recording layer deposited on the disc substrate shown in FIG. 10.

In this manner, the molding surface of the stamper 150 may be used for molding the disc substrate 200 as far as the rim of the central aperture 150a of the stamper 150, as shown in FIG. 9, so that, as shown in FIG. 10, a signal recording region s in which the pre-groove for the recording track(s) or pits may be formed may be extended to a region $S_3$ reaching the inner periphery of the disc substrate 200.

In the metal mold device of the embodiment illustrated, the molding surface of the stamper 150 may be utilized as far as the rim of the centering aperture 150 of the stamper 150. Consequently, if the disc substrate 200 is designed for a small-sized optical disc, and the signal recording region s is formed as far as the inner periphery of the disc substrate 200, the protective film 204 covering the reflective film or the recording layer 203 deposited on the signal recording region s may be deposited on the planar major surface at an inner periphery of the disc substrate 200 over an extent $W_2$ which is markedly wider than in the conventional mold device, as shown in FIG. 11. The result is that the reflective film or the signal recording layer 203 may be reliably covered by the protective film 204 for protecting the reflective film or the signal recording layer 203 from corrosion.

In the embodiment illustrated, the stamper suction unit for causing the stamper 150 to bear against the fixed metal mold 141 under the suction effect of vacuum is used. However, the stamper suction unit may also be so designed that the stamper 150 formed of a magnetic material, such as nickel, may be caused to bear against the stamper loading surface 141a by magnetic attraction of the stamper towards the fixed metal mold 141.

Figure 12:
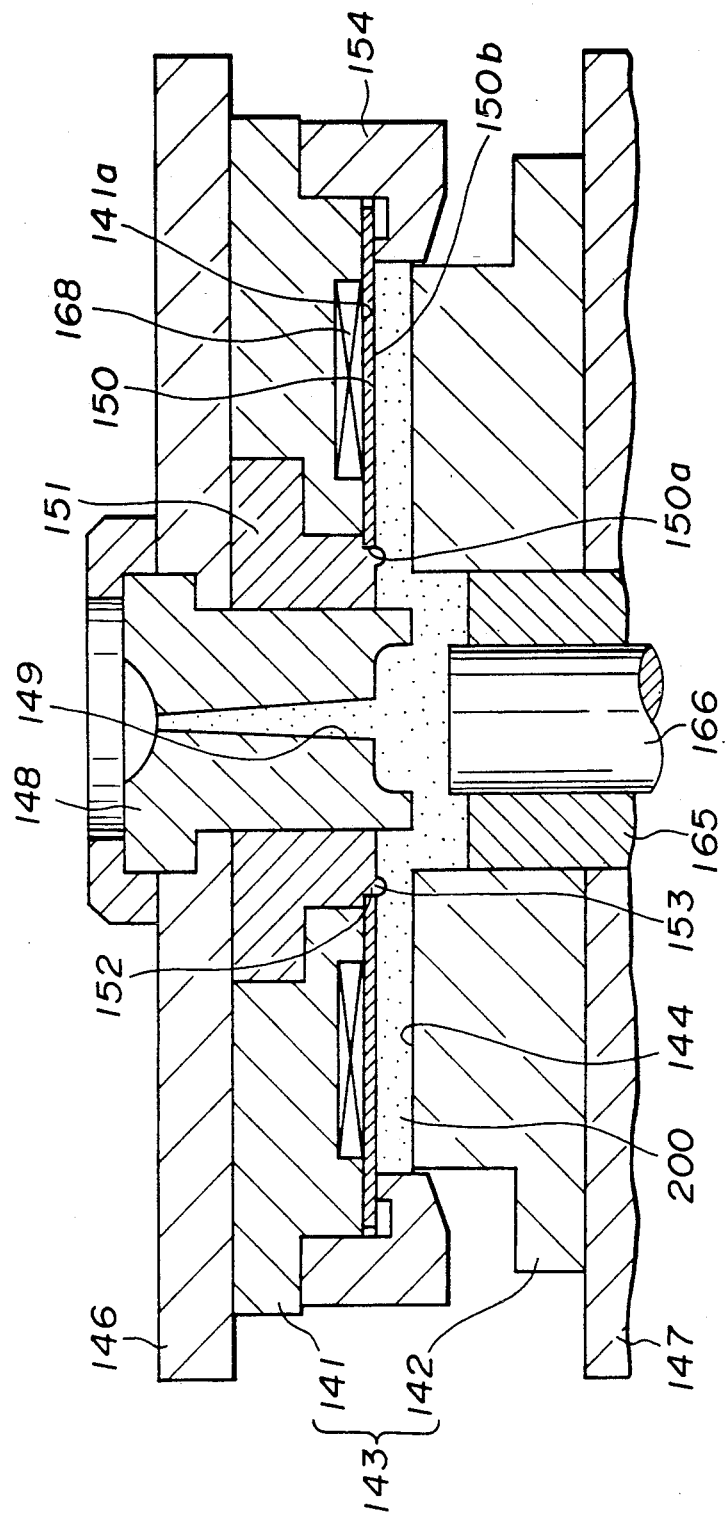
FIG. 12 is a longitudinal cross-sectional view showing a modification of the second embodiment of the metal mold device shown in FIG. 7.

The stamper suction unit utilizing the force of magnetic attraction includes an electro-magnet or a permanent magnet 168 embedded in the portion of the fixed metal mold 141 facing the stamper loading surface 141a, as shown in FIG. 12.

In the embodiment illustrated, the stamper 150 is provided on the fixed metal mold 11. However, the present invention may also be applied to a metal mold device in which the stamper 150 is loaded on the movable metal mold 142. When the stamper 150 is attached to the movable metal mold 142, a stamper holder 151 having an engagement projection 152 engaged in the centering aperture 150a of the stamper 150 is provided at the movable metal mold 142, while the stamper suction unit is also provided at the movable mold 142.

Referring now to FIGS. 13-16, a for forming a disc substrate is explained by way of a third embodiment of the present invention, in which the disc substrate for fabricating an optical disc having a diameter of 64 mm and capable of recording audio signals continuing at least for 74 minutes may be produced with high accuracy.

Figure 13:
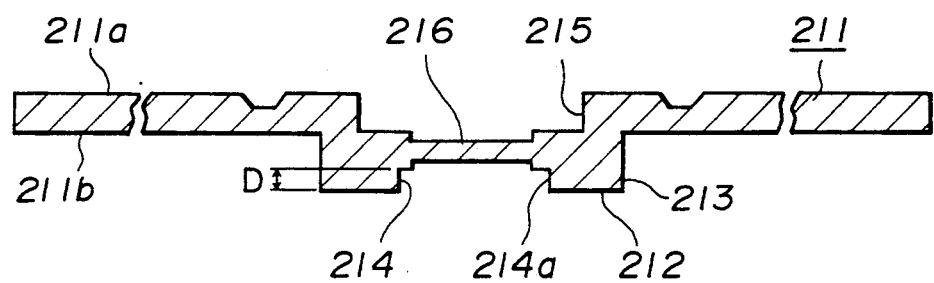
FIG. 13 is a cross-sectional view showing a disc substrate molded in accordance with a third embodiment of the present invention.

The concrete construction of a disc substrate 211 produced in accordance, with the present method is first explained. The disc substrate 211 is molded in the shape of a disk, using a metal mold device for injection molding, as shown in FIG. 13. That is, the disc substrate 211 is molded from a polycarbonate resin having high light-transmitting properties, for example, high transparency, and a signal recording layer, on which a magneto-optical recording medium of the magneto-optical disc is deposited, is formed on a major surface 211a, on which pre-pits defining a recording track(s) are also formed simultaneously with the molding of the disc substrate 211 by a stamper 150 provided in the metal mold device.

The opposite major surface 211b of the disc substrate 211 is a signal readout surface which is irradiated with a light beam outgoing from the optical head when a signal recording layer is formed on the major surface 211a so that the disc substrate may be used as a magneto-optical disc.

The major surface 211b of the disc substrate 21 opposite to the major surface 211a having the signal recording layer is provided with an annular boss 213 having a horizontal loading reference plane 212 at a distal end face thereof for setting the loading height of the disc on the disc table and for setting the horizontal position of the disc relative to the center of rotation of the disc table.

A bottomed centering hole 214 is formed at the center of the disc substrate 211 for extending from the end face of the annular boss 213 defining the above-mentioned reference plane 212 to a mid position along the thickness of the disc substrate. When the disc substrate 211, designed as a magneto-optical disc, is loaded on the disc table, the centering hole 214 is engaged by a centering member, not shown, of the disc table for centering the disc with respect to the center of rotation of the disc table. The centering hole 214 engaged by the outer peripheral surface of the centering member has an inner peripheral surface 214a contiguous to the reference plane 212 at the end face of the annular boss 213. The inner peripheral surface 214a acts as a reference plane for loading of the disc relative to the disc table.

The centering hole 214 has a depth D which is large enough to permit the centering member to be engaged therein with correct centering when the magneto-optical disc is loaded on the disc table.

A metal plate (not shown) receiving recess 215, into which a metal plate attracted by a magnet (not shown) provided on the disc table is fitted, is formed at the center of the major surface 211a of the disc substrate 211.

Figure 14:
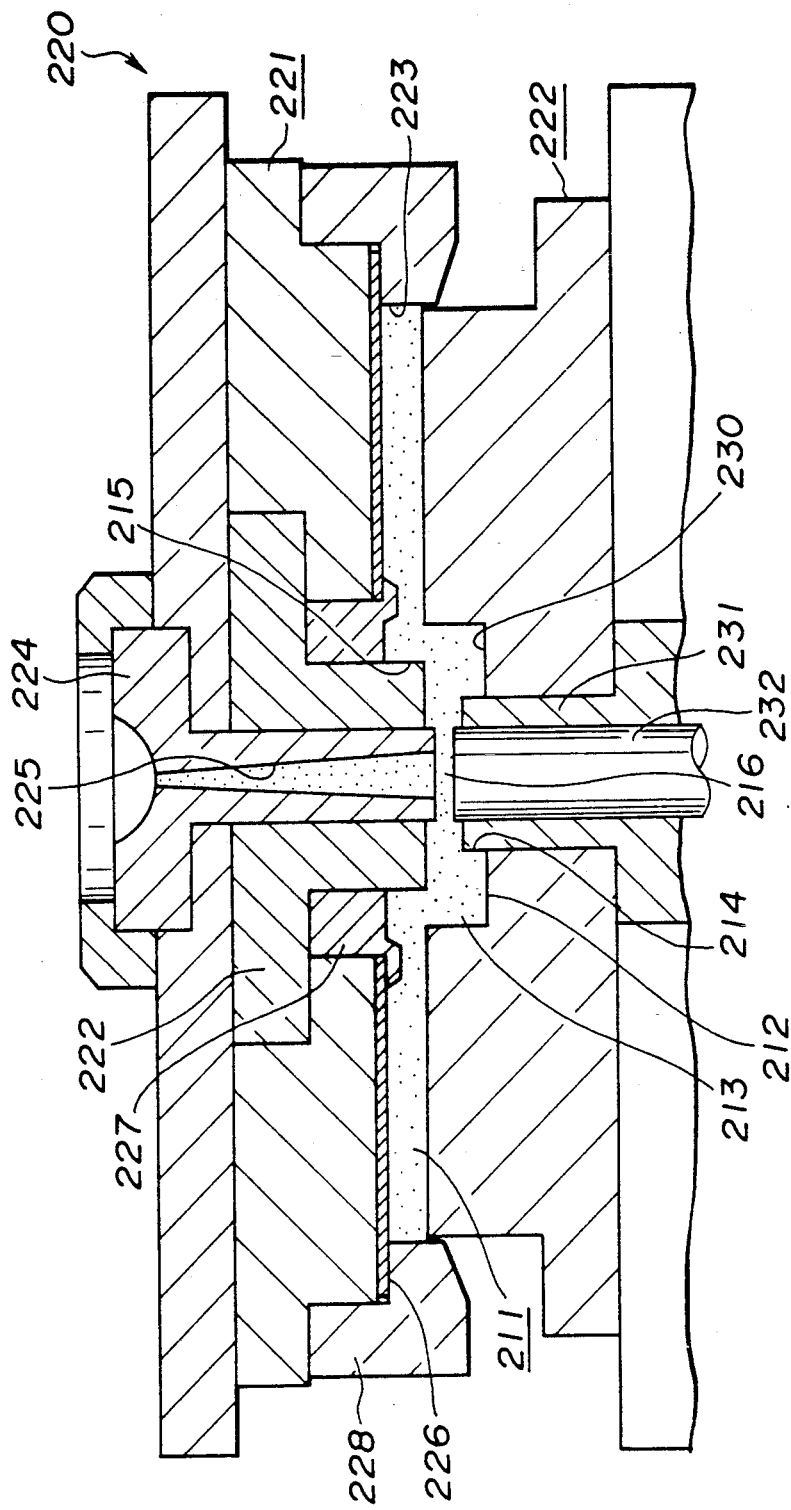
FIG. 14 is a cross-sectional view of a metal mold device showing the state in which the synthetic resin is injected into a metal mold device according to the third embodiment of the present invention for molding a disc substrate.

The above-described disc substrate 211 is molded by a metal mold device 220 constructed as shown in FIG. 14.

The metal mold device 220 is made up of a fixed metal mold 221 and a movable metal mold device 222 and a mold cavity 223 for molding the disc substrate 211 is defined between the fixed metal mold 21 and the movable metal mold 222.

The fixed metal mold 221 is provided with a sprue bushing 224 which is positioned at the center of the mold cavity 223 for allowing molten polycarbonate resin from an injection molding machine, not shown, to flow into the mold cavity 223. The molten polycarbonate resin is caused to flow into the mold cavity 223 via a resin inlet port 225 provided in the sprue bushing 224.

The distal end of the sprue bushing 224 is protruded further into the mold cavity 223 beyond the distal end of an inner stamper holder 227 adapted for molding the metal plate receiving recess 215 as later explained.

A stamper 226 for molding pre-pits defining the recording track(s) is provided on the surface of the fixed metal mold defining the mold cavity 223. The stamper 226 is attached to the fixed metal mold 221 by being supported by inner and outer stamper holders 227, 228, respectively.

The inner stamper holder 227 for supporting the inner periphery of the stamper 226 is fitted to a stamper holder support 229 fitted to the sprue bushing 224, while the outer stamper holder 228 for supporting the outer periphery of the stamper 226 is fitted to the outer periphery of the fixed metal mold 221.

The distal end of the inner stamper holder 227 is protruded into the mold cavity 223 for molding the metal plate attachment recess 215 formed on the major surface 211a of the disc substrate 211.

On the other hand, a recess 230 for molding the annular boss 213 which has its distal end face formed as reference plane 212 and a stationary member 231 protruded halfway in the mold cavity 223 for molding the centering hole 214 are provided in the movable metal mold 222 provided facing the fixed metal mold 221.

A movable member 232 operated as the punch for boring a through-hole 217 at a bottom 216 of the centering hole 214 is provided at the center of the stationary member 231 provided in the movable metal mold 222 for molding the centering hole 214. As shown in FIG. 14, the movable member 232 is smaller in diameter than the stationary member 231 and is protruded further into the mold cavity 223 than the distal end of the stationary member 231.

By providing the movable member 232 in this manner, the movable member 232 may be moved without affecting the inner periphery functioning as the reference plane of the centering hole 214 formed by the stationary member 231.

In the present molding method for molding the disc substrate, the molten polycarbonate resin, supplied from the injection molding machine, not shown, is injected via sprue bushing 224 into the mold cavity 223 of the above-described metal mold device 220 for molding the disc substrate 211 having the bottomed centering hole 214 as shown in FIG. 13.

Figure 15:
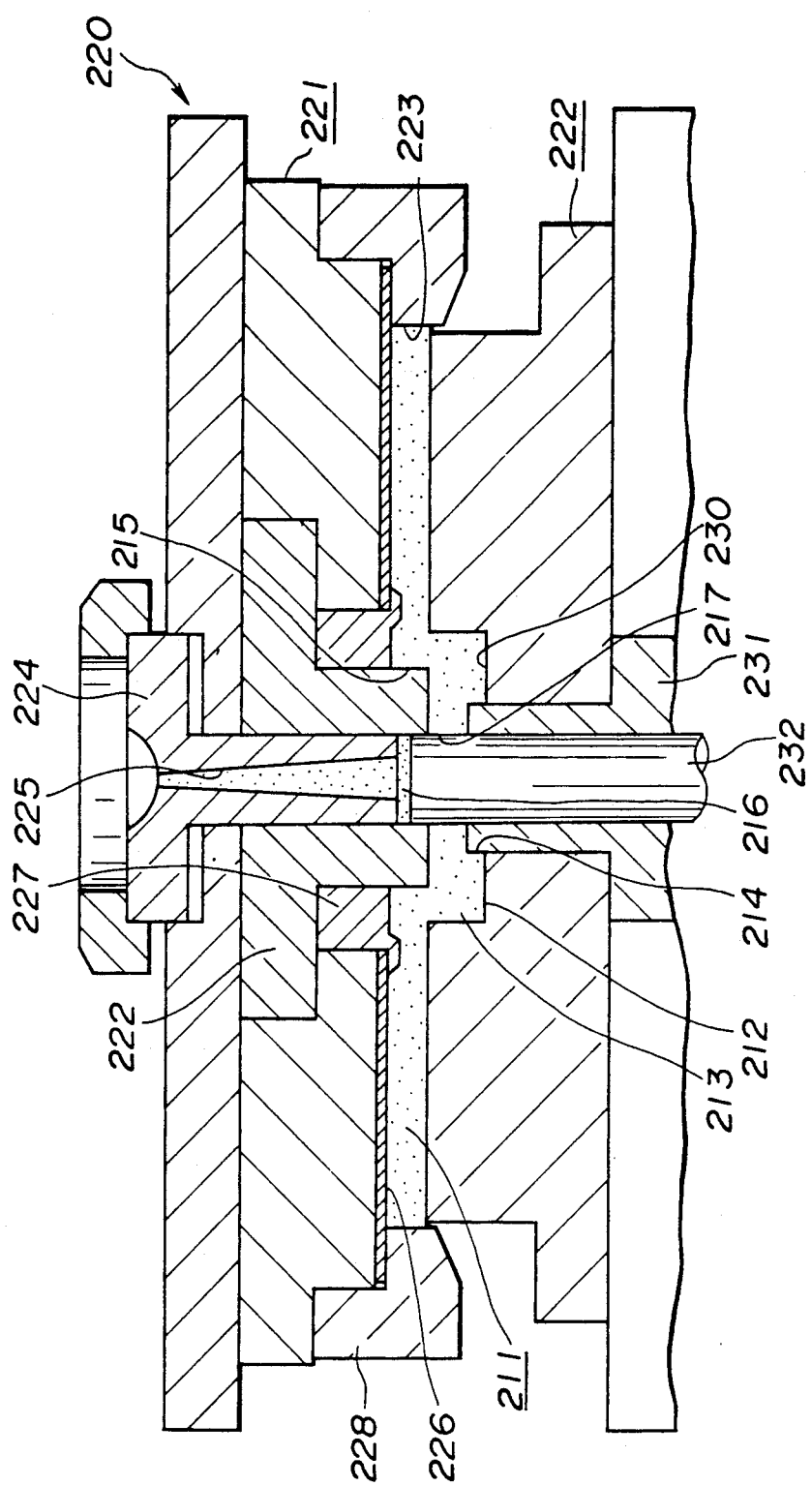
FIG. 15 is a cross-sectional view of the metal mold device shown in FIG. 14 showing the state in which a through-hole is bored in the disc substrate molded by the metal mold device.

After molding the disc substrate 211, the movable member 232 provided in the movable metal mold 222 is protruded towards the fixed metal mold 221 by actuation of movable means, such as a hydraulic unit, as shown in FIG. 15. By protruding the movable member 232 in this manner, the through-hole 217 is bored at the bottom 216 of the centering hole 214.

Meanwhile, when the movable member 232 is protruded for boring the through-hole 217, the distal end of the movable member 223 is protruded from the mold cavity 232 and caused to bear against the distal end of the sprue bushing 224 provided in the fixed mold 221 for pushing the sprue bushing 224 out of the mold cavity 223, as shown in FIG. 15.

The movable member 232 is thereafter withdrawn to the position shown in FIG. 14 after boring the through-hole 217.

Figure 16:
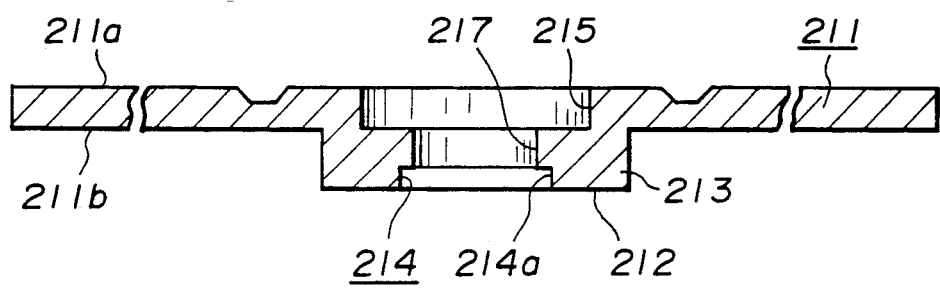
FIG. 16 is a cross-sectional view of a disc substrate formed by the method of the present invention.

The disc substrate is the cured within the metal mold device 220 and taken out from the mold cavity 223 as a disc substrate 211 which may be used for fabricating the magneto-optical disc shown in FIG. 16.

Although the foregoing description is directed to the method for forming a disc substrate used for producing the magneto-optical disc, the present invention may be applied extensively to a disc having a centering aperture and a reference loading plane for loading on the disc table as well as a centering plane with respect to the disc table on the major surface of the disc substrate.

On the other hand, since the disc substrate 211 produced by the above-described embodiment is applied to a magneto-optical disc provided with a metal plate for magnetic clamping, the through-hole 217 has the function of transmitting the magnetic flux from the magnet provided on the disc table when the magneto-optical disc is produced from the disc substrate 211.

Besides, the through-hole 217 of the disc substrate 211 produced in accordance with the present method may also be engaged by a grip used for transporting the disc substrate 211 in the course of the production process of producing the information-recording disc.

What is claimed is:

1. A metal mold device for molding a substrate having a projection, the projection being formed in a central portion of the substrate and having an opening, the device comprising:
   a first metal mold,
   a second metal mold mounted facing said first metal mold, one of the first metal mold and the second metal mold being movable toward and away from the other of the first metal mold and the second metal mold, the second metal mold defining a mold cavity between it and said first metal mold,
   a stamper mounted on said first metal mold and arranged within said mold cavity,
   first stamper supporting means for holding a radially outer side of the stamper and being attached to the first metal mold, the first stamper supporting means constituting an outer edge of the mold cavity, second stamper supporting means provided on the first metal mold for attracting a radially inner side of the stamper to the first metal mold, and a sprue bushing having a resin injection port for guiding the molten resin therethrough, said sprue bushing being mounted on said first metal mold for facing said injection port within said mold cavity via a mid part of said first metal mold, said sprue bushing being engaged with the central aperture in said stamper for positioning said stamper.

2. The metal mold device as defined in claim 1 wherein said second stamper supporting means is arranged at a position in register with an inner periphery of the first metal mold for supporting an inner periphery of said stamper with respect to said first metal mold.

3. The metal mold device as defined in claim 2 wherein said second stamper supporting means include an annular passage formed in the first metal mold and means for connecting a vacuum pump to said annular passage.

4. The metal mold device as defined in claim 1 wherein said second stamper supporting means comprises a magnetic device provided in the first metal mold.

5. A metal mold device for molding a substrate comprising:

a first metal mold, a second metal mold mounted facing said first metal mold, one of the first metal mold and the second metal mold being movable toward and away from the other of said first metal mold and said second metal mold, the second metal mold defining a mold cavity between it and said first metal mold, a stamper mounted on said first metal mold and arranged within said mold cavity, a sprue bushing having a resin injection port for guiding the molten resin therethrough, said sprue bushing being mounted on said first metal mold for facing said injection port within said mold cavity via a mid part of said first metal mold, said sprue bushing being engaged with the central aperture in said stamper for positioning said stamper, holding means for holding an outer rim of the stamper with respect to the first metal mold, and stamper attraction means mounted in the metal mold on which said sprue bushing is mounted for holding said stamper by attraction.

6. The metal mold device as defined in claim 5 wherein said stamper attraction means is arranged at a position in register with an inner periphery of the first metal mold for supporting an inner periphery of said stamper with respect to said first metal mold.

7. A metal mold device for molding a disc substrate having a bottomed centering aperture and a reference loading plane for disc rotating and driving means, said reference loading plane being substantially parallel to the planar region on which a reproducing light beam is incident, said reference loading plane being projected from said planar region, comprising a first metal mold, a second metal mold mounted facing said first metal mold, one of the first metal mold and the second metal mold being movable toward and away from the other of said first metal mold and said second metal mold, the second metal mold defining a mold cavity between it and said first metal mold, a stamper having a central aperture, mounted on said first metal mold, and arranged within said mold cavity, mounting means for mounting said stamper on said first metal mold, a first member mounted on the second metal mold for forming said bottomed centering hole, a second member arranged inwardly of said first member on the same axis as said first member, said second member being movable relative to the second metal mold for forming said through-hole, and a sprue bushing having a resin injection port for guiding the molten resin therethrough, said sprue bushing being mounted on said first metal mold for facing said injection port within said mold cavity via a mid part of said first metal mold, said sprue bushing being engaged with the central aperture in said stamper for positioning said stamper.

* * * * *